United States Patent
Otaki

(10) Patent No.: US 11,243,731 B2
(45) Date of Patent: Feb. 8, 2022

(54) INFORMATION PROCESSING APPARATUS TO ASSOCIATE WITHOUT REPLACING IDENTIFICATION INFORMATION WITH DIFFERENT PIECE OF IDENTIFICATION INFORMATION, WORKFLOW SYSTEM, AND NON-TRANSITORY COMPUTER READABLE MEDIUM

(71) Applicant: FUJIFILM Business Innovation Corp., Tokyo (JP)

(72) Inventor: Masanobu Otaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 215 days.

(21) Appl. No.: 16/352,850

(22) Filed: Mar. 14, 2019

(65) Prior Publication Data
US 2019/0377530 A1  Dec. 12, 2019

(30) Foreign Application Priority Data
Jun. 6, 2018  (JP) .............................. JP2018-108542

(51) Int. Cl.
*G06F 3/12*  (2006.01)

(52) U.S. Cl.
CPC .......... *G06F 3/1265* (2013.01); *G06F 3/1205* (2013.01); *G06F 3/1262* (2013.01); *G06F 3/1263* (2013.01)

(58) Field of Classification Search
CPC ...................................................... G06F 3/1265
USPC ........................................................ 358/1.15
See application file for complete search history.

(56) References Cited

U.S. PATENT DOCUMENTS

| | | | | |
|---|---|---|---|---|
| 2010/0293133 A1* | 11/2010 | Jones | ..................... | G06F 40/166 706/54 |
| 2013/0166579 A1* | 6/2013 | Saito | ...................... | G06F 16/93 707/758 |
| 2019/0208066 A1* | 7/2019 | Sakata | ............... | G06F 16/5866 |

FOREIGN PATENT DOCUMENTS

JP         2003308184        10/2003

* cited by examiner

*Primary Examiner* — Jacky X Zheng
(74) *Attorney, Agent, or Firm* — JCIPRNET

(57) ABSTRACT

An information processing apparatus includes a generation unit, an adding unit, and an association unit. The generation unit generates, in a case where additional processing needs to be performed on input information in a workflow, unique information for uniquely identifying the information. The adding unit adds the unique information generated by the generation unit to identification information for identifying the information to generate new identification information of the information. The association unit associates the new identification information generated by the adding unit with the information.

13 Claims, 8 Drawing Sheets

FIG. 1

```
UPSTREAM PROCESS
      │ JOB      │ JOB
      ▼          ▼
PRE-PROCESSING PROCESS
  [EQUIPMENT]  [EQUIPMENT] 10
      │ JOB      │ JOB
      ▼          ▼
PRINTING PROCESS
  [EQUIPMENT] [EQUIPMENT] [EQUIPMENT] [EQUIPMENT]
      │ JOB   │ JOB   │ JOB   │ JOB
      ▼       ▼       ▼       ▼
POST-PROCESSING PROCESS
  [EQUIPMENT] [EQUIPMENT] [EQUIPMENT] [EQUIPMENT]
      │ JOB   │ JOB   │ JOB   │ JOB
      ▼       ▼       ▼       ▼
SHIPPING PROCESS
```

FIG. 5

| REGISTRATION DATE AND TIME | SYSTEM NAME | JOB NUMBER | JOB NAME | PROCESSING RESULT | NUMBER OF BYTES | NUMBER OF PROCESSING TIMES | CONNECTION METHOD | OUTPUT APPARATUS NAME |
|---|---|---|---|---|---|---|---|---|
| 2018/3/26 17:35:05 | SPOOLER SYSTEM A | JOB0001 | JOB NAME1_ID =7b5c3950 | COMPLETED | 172015 | 2 | LPR | PRINTER1 |
| 2018/3/26 19:05:43 | SPOOLER SYSTEM A | JOB0002 | JOB NAME3_ID =1037fc47 | COMPLETED | 90322015 | 1 | LPR | PRINTER1 |
| .. | .. | .. | .. | .. | .. | .. | .. | .. |

FIG. 6

| JOB LIST | | | SPOOLER SYSTEM A | | |
|---|---|---|---|---|---|
| DISPLAY CONDITIONS | | | | | |

[HOLD] [RE-PROCESS] [INTERRUPT] [DELETE]

NUMBER OF DISPLAY RESULTS: [▼]　　0 - 0 (0 RESULTS) [⇤][⇦][1][⇨][⇥] [SEARCH]

| JOB NAME | REGISTRATION DATE AND TIME | DATA SIZE | JOB STATE | NUMBER OF PROCESSING TIMES | PRINTER |
|---|---|---|---|---|---|
| JOB NAME1_ID = 7b5c3950 | 2018/3/26 17:35 | 172015 | PRINTING COMPLETED | 2 | PRINTER1 |
| JOB NAME3_ID = 1037fc47 | 2018/3/26 19:05 | 90322015 | PRINTING COMPLETED | 1 | PRINTER1 |

· · · · ·

NUMBER OF DISPLAY RESULTS: [ ]　　0 - 0 (0 RESULTS) [⇤][⇦][1][⇨][⇥] [SEARCH]

[HOLD] [RE-PROCESS] [INTERRUPT] [DELETE]

FIG. 7

| REGISTRATION DATE AND TIME | SYSTEM NAME | JOB NUMBER | JOB NAME | PROCESSING RESULT | NUMBER OF BYTES | NUMBER OF PROCESSING TIMES | CONNECTION METHOD | OUTPUT APPARATUS NAME |
|---|---|---|---|---|---|---|---|---|
| 2018/3/26 17:55:15 | SPOOLER SYSTEM B | JOB0001 | JOB NAME1_ID =a27a7a5d | COMPLETED | 232342 | 1 | LPR | PRINTER1 |
| 2018/3/27 09:24:43 | SPOOLER SYSTEM B | JOB0002 | JOB NAME2_ID =f87469e1 | COMPLETED | 152419 | 1 | LPR | PRINTER2 |
| .. | .. | .. | .. | .. | .. | .. | .. | .. |

FIG. 8

| JOB LIST | | | SPOOLER SYSTEM B | | |
|---|---|---|---|---|---|
| DISPLAY CONDITIONS | | | | | |

[HOLD] [RE-PROCESS] [INTERRUPT] [DELETE]

NUMBER OF DISPLAY RESULTS: [ ] 0 - 0 (0 RESULTS) [⇐][⇐][1][⇒][⇒] [SEARCH]

| JOB NAME | REGISTRATION DATE AND TIME | DATA SIZE | JOB STATE | NUMBER OF PROCESSING TIMES | PRINTER |
|---|---|---|---|---|---|
| JOB NAME1_ID = a27a7a5d | 2018/3/26 17:55 | 232342 | PRINTING COMPLETED | 1 | PRINTER1 |
| JOB NAME2_ID = f87469e1 | 2018/3/27 9:24 | 152419 | PRINTING COMPLETED | 1 | PRINTER2 |

· · · ·

NUMBER OF DISPLAY RESULTS: [ ] 0 - 0 (0 RESULTS) [⇐][⇐][1][⇒][⇒] [SEARCH]

[HOLD] [RE-PROCESS] [INTERRUPT] [DELETE]

FIG. 9

| JOB LIST | | | |
|---|---|---|---|
| PRINTER(P) DOCUMENT(D) DISPLAY(V) | | | x |
| JOB ID | QUEUE | JOB NAME | STATE |
| 001 | Q001 | JOB NAME1_ID=7b5c3950 | OUTPUT COMPLETED |
| 002 | Q001 | JOB NAME1_ID=a27a7a5d | OUTPUT COMPLETED |
| 003 | Q001 | JOB NAME1_ID=7b5c3950_REP=17e3febb | HOLD |
| 004 | Q001 | JOB NAME3_ID=1037fc47_SEP=904f26ba | ERROR |
| 005 | Q001 | JOB NAME3_ID=1037fc47_SEP=904f26ba | OUTPUT COMPLETED |
| 006 | Q001 | JOB NAME3_ID=1037fc47_SEP=9ks72bs0 | OUTPUT COMPLETED |
| ........ | | | |

INFORMATION PROCESSING APPARATUS TO ASSOCIATE WITHOUT REPLACING IDENTIFICATION INFORMATION WITH DIFFERENT PIECE OF IDENTIFICATION INFORMATION, WORKFLOW SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-108542 filed Jun. 6, 2018.

BACKGROUND

(i) Technical Field

The present disclosure relates to an information processing apparatus, a workflow system, and a non-transitory computer readable medium, and more particularly, to association of information over the entire workflow system.

(ii) Related Art

For example, in printing workflow systems associated with a printing service, information sharing is implemented using an industry-wide standard document format called a job definition format (JDF) for sharing information among processes such as a pre-processing (pre-press) process, a printing (press) process, and a post-processing (post-press) process and a communication format called a job messaging format (JMF) for carrying out communication of the progress state of an operation and information on change of specifications in a workflow system using the JDF. Furthermore, inter-process information is centrally controlled using a management information system (MIS), and the operational efficiency may thus be improved.

A technique for replacing a job name based on unique information used in common among processes in a printing workflow system even if the processes include a process using equipment that does not support the JDF or the JMF and separately managing the unique information and the job name in association with each other so that jobs in the processes may be associated with each other, has been suggested (see, for example, Japanese Unexamined Patent Application Publication No. 2003-308184).

SUMMARY

Aspects of non-limiting embodiments of the present disclosure relate to associate, without replacing identification information on information that is originally to be processed in a workflow with a different piece of identification information, the information that is originally to be processed in the workflow with information that is to be additionally processed in the workflow.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a generation unit, an adding unit, and an association unit. The generation unit generates, in a case where additional processing needs to be performed on input information in a workflow, unique information for uniquely identifying the information. The adding unit adds the unique information generated by the generation unit to identification information for identifying the information to generate new identification information of the information. The association unit associates the new identification information generated by the adding unit with the information.

BRIEF DESCRIPTION OF THE DRAWINGS

An exemplary embodiment of the present disclosure will be described in detail based on the following figures, wherein:

FIG. 1 is a diagram illustrating the entire configuration of a workflow system according to an exemplary embodiment of the present disclosure;

FIG. 5 is a diagram illustrating an example of a data configuration of job logs managed by a spooler system according to the exemplary embodiment;

FIG. 6 is a diagram illustrating a display example of part of a list of jobs managed by a spooler system according to the exemplary embodiment;

FIG. 7 is a diagram illustrating an example of a data configuration of job logs managed by a different spooler system according to the exemplary embodiment;

FIG. 8 is a diagram illustrating a display example of part of a list of jobs managed by the different spooler system according to the exemplary embodiment; and FIG. 9 is a diagram illustrating a display example of a list of jobs received from a spooler system according to the exemplary embodiment.

DETAILED DESCRIPTION

An exemplary embodiment of the present disclosure will be described below with reference to drawings.

FIG. 1 a diagram illustrating the entire configuration of a workflow system according to an exemplary embodiment of the disclosure. In this exemplary embodiment, a case where a workflow system is applied to a printing workflow system associated with a printing service will be described as an example.

In a printing workflow system, a printing service is carried out smoothly by causing a job to pass through a plurality of processes. In FIG. 1, a printing workflow system that implements a workflow for causing a job transmitted from an upstream process to pass through a pre-processing (pre-press) process, a printing (press) process, a post-processing (post-press) process, and a shipping process to ship a printed material to a specified place, is illustrated. As exemplified in the pre-processing process, the printing process, and the post-processing process, a plurality of pieces of equipment of the same type or different types may be provided, depending on the amount or type of processing required.

Figure 2:
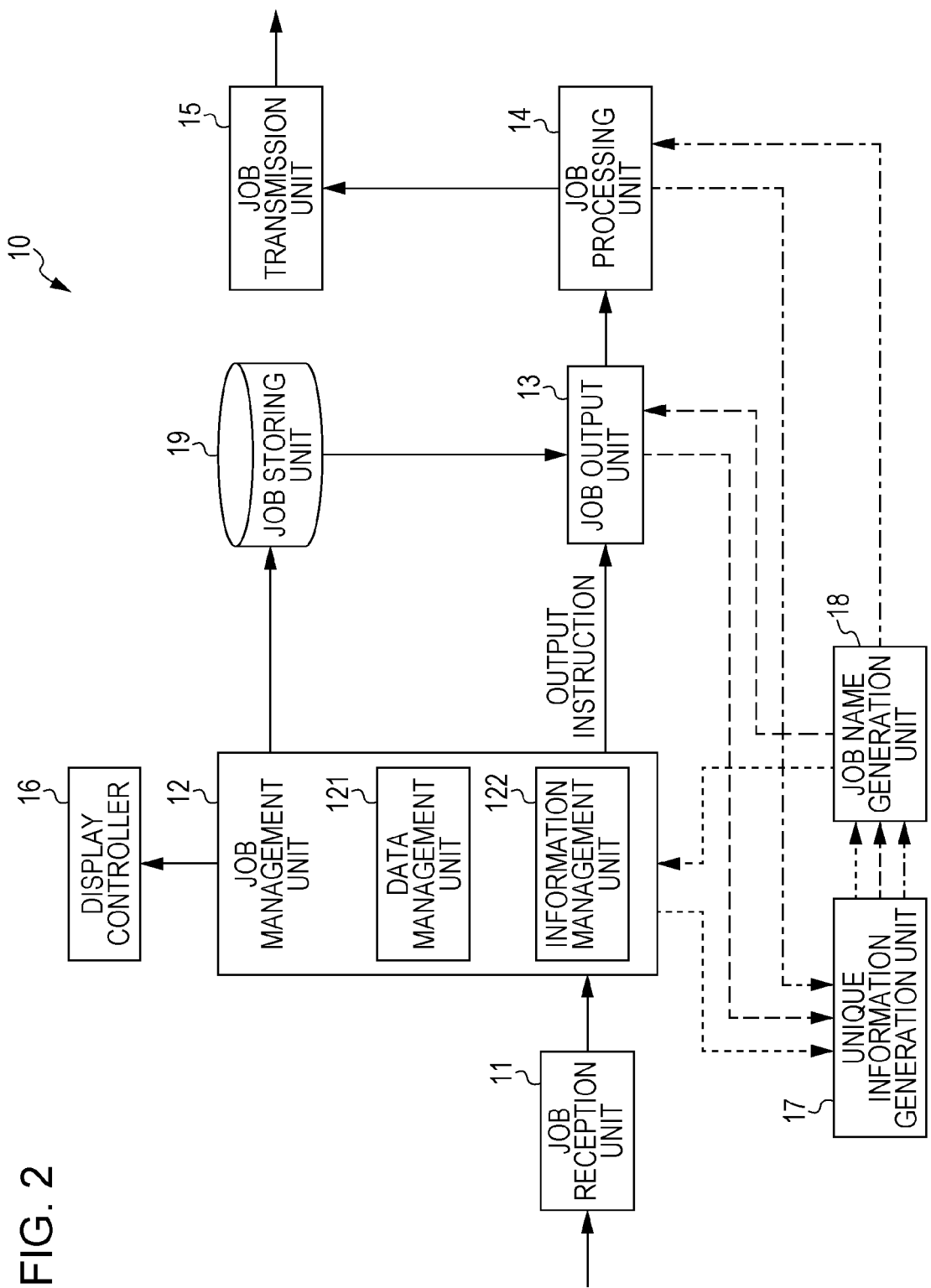
FIG. 2 is a block configuration diagram of a spooler system according to the exemplary embodiment.

FIG. 2 is a block configuration diagram of a spooler system 10 according to this exemplary embodiment. The spooler system 10 is equipment that is introduced to implement the pre-processing process of the workflow system.

The spooler system 10 may be implemented by an existing general-purpose hardware configuration in which an information processing apparatus is mounted. That is, the spooler system 10 includes a central processing unit (CPU), memories such as a read only memory (ROM), a random access memory (RAM), and a hard disk drive (HDD), a network interface (IF) provided as a communication unit, user interfaces including a mouse and a keyboard as an input unit and a liquid crystal panel as a display. In this exemplary embodiment, the spooler system 10 that is used in the pre-processing process as equipment in which an information processing apparatus is mounted will be explained as an example. However, the spooler system 10 may be equipment used in a different process.

The spooler system 10 according to this exemplary embodiment includes a job reception unit 11, a job management unit 12, a job output unit 13, a job processing unit 14, a job transmission unit 15, a display controller 16, a unique information generation unit 17, and a job name generation unit 18. In FIG. 2, components that are not used for explanation of this exemplary embodiment are omitted. The job reception unit 11 receives a job for which a printing instruction is issued to the spooler system 10 from the upstream process. The job management unit 12 manages the job received by the job reception unit 11. The job received from the job reception unit 11 is stored in a job storing unit 19. A job includes printing data as a printing target and printing attribute information on a job such as a job name. A data management unit 121 included in the job management unit 12 manages the printing data, and an information management unit 122 manages the printing attribute information.

The job output unit 13 extracts from the job storing unit 19 a corresponding job in response to a printing instruction from the job management unit 12 and outputs the extracted job to the job processing unit 14. The job processing unit 14 performs processing set on the spooler system 10 for a job for which an output instruction is issued. The job transmission unit 15 transmits the printing data and the printing attribute information processed by the job processing unit 14 to the printing process (printer) in a subsequent stage. The display controller 16 performs display control for information regarding a job managed by the job management unit 12.

The unique information generation unit 17 generates unique information to be given to a job name of a passed job so that the job may be uniquely identified. In this exemplary embodiment, in the case where additional processing needs to be performed on an input job in a workflow, additional processing is performed in the job output unit 13 and the job processing unit 14. The unique information generation unit 17 generates unique information in response to a request from the job output unit 13 and the job processing unit 14. Furthermore, regardless of whether or not additional processing is necessary, the unique information generation unit 17 generates unique information in response to a request from the job management unit 12 when a job is input. A job is an example of information input from the upstream process. In this exemplary embodiment, a case where a job name is handled as identification information of a job will be explained as an example.

When the unique information generation unit 17 generates unique information, the job name generation unit 18 adds the unique information to a job name to generate a new job name of the job. The job management unit 12 manages the job by associating the newly generated job name with the job.

A plurality of spooler systems 10 may be provided in the pre-processing process. Each of the spooler systems 10 include the configuration described above.

The job reception unit 11, the job management unit 12, the job output unit 13, the job processing unit 14, the job transmission unit 15, the display controller 16, the unique information generation unit 17, and the job name generation unit 18 of the spooler system 10 are implemented by a cooperative operation of a computer mounted in the spooler system 10 and a program caused to operate by a CPU mounted in the computer. Furthermore, the job storing unit 19 is implemented by an HDD mounted in the spooler system 10. Alternatively, a RAM or an external memory may be used via a network.

Furthermore, a program used in this exemplary embodiment may not only be supplied by a communication unit but also be stored in a computer-readable recording medium such as a compact disc-read only memory (CD-ROM) or a universal serial bus (USB) memory and supplied. Programs supplied by the communication unit or the recording medium are installed into a computer, and various types of processing are implemented when the CPU of the computer sequentially executes the programs.

In the spooler system 10, a job is processed in accordance with a workflow in which the job reception unit 11 receives the job transmitted from the upstream process, the job management unit 12 holds and manage the job, the job output unit 13 outputs the job in accordance with an output instruction from the job management unit 12, the job processing unit 14 performs processing set for the job, and the job transmission unit 15 transmits the processed job to the next process. As described above, processing to be originally processed is performed on a job in accordance with a workflow. However, for example, in the case where a job of a specific size or more is not able to be processed due to a problem regarding the capability of a printer in the printing process or the like, the job processing unit 14 needs to perform additional processing for dividing the job. In contrast, a plurality of jobs may need to be combined together. Furthermore, due to some reason, the job that has once been output by the job output unit 13 may need to be output again. As described above, dividing a job, combining jobs together, and re-outputting a job are each additional processing that is different from processing to be originally processed on a job in a workflow.

This exemplary embodiment is characterized in that a job name of a job transmitted from the upstream process is able to be confirmed by the job name in any configuration included in the spooler system 10 and the fact that additional processing has been performed and the type of the additional processing performed are able to be specified by the job name in the case where the additional processing is performed on the job in the workflow.

An operation of the spooler system 10 according to this exemplary embodiment will be described below.

Figure 3:
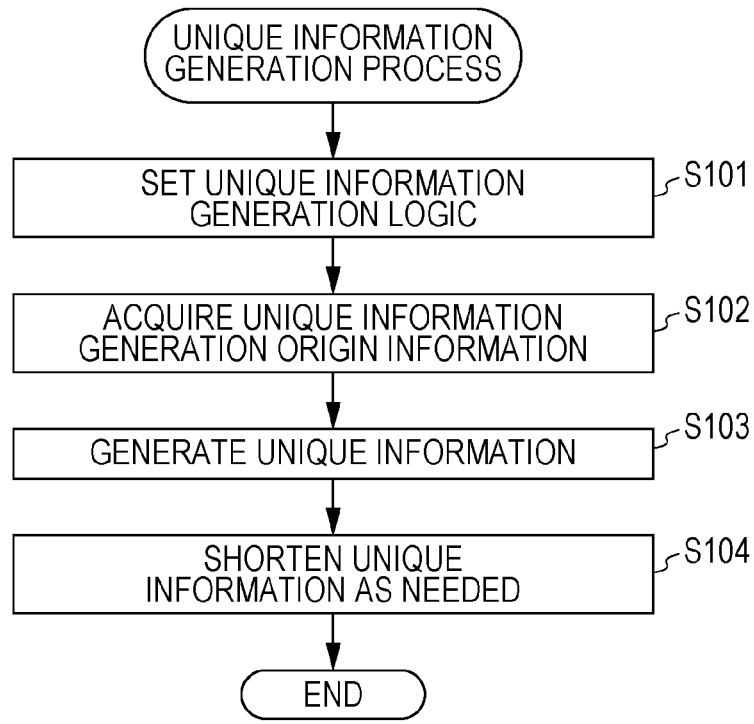
FIG. 3 is a flowchart illustrating a unique information generation process according to the exemplary embodiment.

When the job reception unit 11 receives a job transmitted from the upstream process, the job management unit 12 stores the job into the job storing unit 19 or the like to hold and manage the job. At this time, when the job management unit 12 passes a job name to the unique information generation unit 17, the unique information generation unit 17 is activated. A unique information generation process performed by the unique information generation unit 17 will be explained below with reference to a flowchart of FIG. 3.

When the unique information generation unit 17 is activated, the unique information generation unit 17 sets a unique information generation logic to be used for generation of unique information (step S101). In this exemplary embodiment, there are a calculation logic for hash values, random numbers, and the like as a unique information generation logic. A unique information generation logic to be used for generation of unique information is set based on the calculation logic for hash values, the random numbers, or the like. A unique information generation logic may be set in accordance with a specific setting condition based on input of the received job name and information such as the date and time at which the job name is received, or unique information generation logics may be used in turn. Alternatively, a unique information generation logic may be set in advance.

Next, the unique information generation unit 17 acquires predetermined printing attribute information (a job name, a processing date and time, a job ID, and so on) as an origin of unique information (step S102). Then, the unique information generation unit 17 generates unique information, based on the acquired information, in accordance with the set unique information generation logic (step S103). As described above, by causing unique information to be dependent on printing attribute information of a job, unique information that is unique in the workflow system may be generated easily.

The number of digits of unique information generated using a hash value, a random number, or the like may be large. Therefore, if generated unique information is directly used as a job name, the job name may exceed the length limit of a job name in a process. Thus, taking into consideration the case where a limit is imposed on a job name, the unique information generation unit 17 reduces the number of digits of the generated unique information to a predetermined value (step S104).

Figure 4:
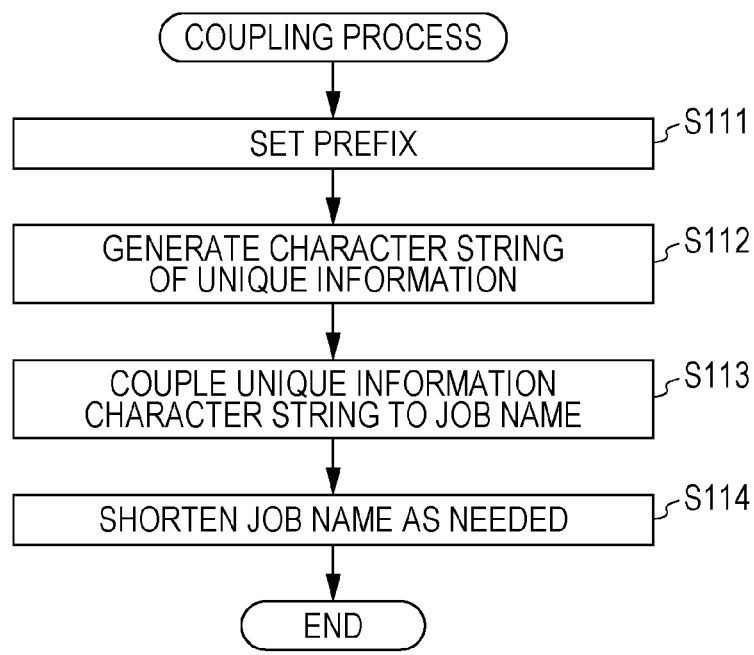
FIG. 4 is a flowchart illustrating a job name generation process according to the exemplary embodiment.

When the unique information is generated by the unique information generation unit 17, the generated unique information, the job name, and classification information of the unique information are passed to the job name generation unit 18, so that the job name generation unit 18 is activated. A job name generation process performed by the job name generation unit 18 will be explained below with reference to a flowchart illustrated in FIG. 4.

When the job name generation unit 18 is activated, the job name generation unit 18 sets a prefix, based on classification information, as described below (step S111).

First, a prefix is a character string incorporated into a new job name and includes a character string ("ID" or the like, as described later) serving as specific information for specifying each piece of classification information. In FIG. 2, as indicated by different types of arrows, the job management unit 12, the job output unit 13, or the job processing unit 14 instructs the unique information generation unit 17 to generate unique information. The job output unit 13 and the job processing unit 14, out of the job management unit 12, the job output unit 13, and the job processing unit 14, issue an instruction to generate unique information in the case where additional processing is to be performed. The job management unit 12 issues an instruction to generate unique information when a job is input, independently of additional processing. Furthermore, because division of a job or combining of jobs is performing as additional processing in the job processing unit 14, it is preferable that additional processing may be determined. As described above, classification information is information that allows an issuance source of a generation instruction for unique information to be specified (it may also be said that whether or not the generation instruction is based on additional processing may be specified). In the case where a generation instruction for unique information is issued from the same generation instruction issuance source, the classification information allows the type of the additional processing to be specified.

In this exemplary embodiment, "_ID=" indicating that a generation instruction issuance source is the job management unit 12 and unique information is to be generated in response to reception of a job, "_REP=" indicating that a generation instruction issuance source is the job output unit 13 and additional processing is re-printing, "_SEP=" indicating that a generation instruction issuance source is the job processing unit 14 and additional processing is division of a job, and "_COM=" indicating that a generation instruction issuance source is the job processing unit 14 and additional processing is combining of jobs are used as prefixes. Here, the unique information generation unit 17 generates unique information in response to a generation instruction issued from the job management unit 12, and thus generates classification information indicating that the generation instruction issuance source is the job management unit 12. The job name generation unit 18 sets, based on the classification information, "_ID=" as a prefix.

Next, the job name generation unit 18 couples the unique information generated by the unique information generation unit 17 to the prefix to generate a character string of the unique information to be added to a job name (step S112). Then, the job name generation unit 18 couples the character string of the unique information to the job name to generate a new job name (step S113). Furthermore, as with the unique information generation unit 17, the job name generation unit 18 reduces the number of digits of the generated unique information to a predetermined value, and generates a new job name having a length less than or equal to a preset threshold (step S114).

The job management unit 12 receives the new job name generated by the job name generation unit 18 as described above.

FIG. 5 is a diagram illustrating an example of a data configuration of job logs managed by the spooler system 10 according to this exemplary embodiment. FIG. 6 is a diagram illustrating a display example of a job list displayed based on job logs. As is clear from FIGS. 5 and 6, new job names are generated by adding unique information ("_ID=7b5c3950" and "_ID=1037fc47" to original job names ("job name 1" and "job name 3") transmitted from the upstream process.

Let two spooler systems be provided in the pre-processing process. In the case where the spooler systems are a spooler system A and a spooler system B, FIGS. 5 and 6 correspond to the spooler system A. FIG. 7 is a diagram illustrating an example of a data configuration of job logs managed by the spooler system B. FIG. 8 is a diagram illustrating a display example of a job list displayed based on job logs in the spooler system B. As is clear with reference to the job list in the spooler system B, job names are generated by adding unique information ("_ID=a27a7a5d" and "_ID=f87469e1") to original job names ("job name 1" and "job name 2") transmitted from the upstream process.

As may be understood by paying attention to original job names in the spooler systems A and B, the upstream process passes the same job name "job name 1" to the spooler systems A and B. If this job name is passed to a process in a subsequent stage, mixing up may occur. Thus, in this exemplary embodiment, a new job name is generated by adding the above-mentioned unique information to a job transmitted from the upstream process, regardless of whether or not additional processing (re-outputting, division, and combining) is necessary. Therefore, jobs having the same name "job name 1" may be separately managed. Accordingly, even in the case where jobs having the same job name "job name 1" meet in processing or a process in a subsequent stage, the jobs are not mixed up.

When receiving an output instruction from the job management unit 12, the job output unit 13 extracts a specified job from the job storing unit 19 and passes the job to the job processing unit 14. At this time, in the case where the instruction for the number of output times of the job is two or more, the job output unit 13 determines that the output instruction is a re-output instruction. The number of output times of a job is information managed by the information management unit 122 and indicated as the number of processing times in the job list displayed. In the case where it is determined that the output instruction corresponds to re-outputting for the second or subsequent times, the job output unit 13 passes a job name included in the output instruction from the job management unit 12 to the unique information generation unit 17, so that the unique information generation unit 17 is activated. Processing performed by the unique information generation unit 17 has been explained above with reference to FIG. 3, and therefore, redundant explanation will be omitted here. When receiving unique information generated by the unique information generation unit 17, a job name, and classification information, the job name generation unit 18 performs the job name generation processing described above to generate a new job name. In this case, information for specifying the job output unit 13 or the fact that additional processing regards re-outputting is set in the classification information. Therefore, the job name generation unit 18 sets "_REP=" as a prefix. The job name generation unit 18 receives a newly generated job name from the job name generation unit 18. When the job is output to the job processing unit 14, the job name received from the job name generation unit 18 is used as the job name of the job to be output.

If the job name generated by the job name generation unit 18 is not used, the job name of the output job is the same as the job name of the re-output job, and these jobs are not distinguished from each other. However, in this exemplary embodiment, these jobs may be distinguished from each other.

For example, a subscript such as "n" (n represents a positive integer indicating the number of re-output times) may be added to a prefix, as in "_REPn=" to support a plurality of re-output instructions.

Furthermore, the job name generation unit 18 transmits the generated job name to the job management unit 12 so that the job is associated with the generated job name.

When receiving a job output from the job output unit 13, the job processing unit 14 performs specific processing in accordance with the workflow. Then, the job is transmitted to the next printing process by the job transmission unit 15. However, in the case where the size of the job exceeds an upper limit of a printer used in the printing process, the job processing unit 14 performs additional processing for dividing the job. In this case, the job processing unit 14 passes the job name of the job received from the job output unit 13 and the identification information of the additional processing to the unique information generation unit 17, so that the unique information generation unit 17 is activated. The processing performed by the unique information generation unit 17 has been explained above with reference to FIG. 3, and therefore, redundant explanation will be omitted here. Then, when receiving the unique information generated by the unique information generation unit 17, the job name, and the classification information, the job name generation unit 18 performs the job name generation processing described above to generate a new job name. In this case, when acknowledging, according to the classification information, that division of the job is performed by the job processing unit 14 as additional processing, the job name generation unit 18 sets "_SEP=" as a prefix. The job processing unit 14 receives a newly generated job name from the job name generation unit 18. The job processing unit 14 uses the job name received from the job name generation unit 18 as the job name of a job to be passed to the job transmission unit 15.

Furthermore, the job name generation unit 18 transmits the generated job name to the job management unit 12 and associates the job with the newly generated job name.

The job transmission unit 15 transmits the job received from the job processing unit 14 to the next printing process. A job name to which unique information for identifying the job or, in the case where the additional processing is performed, unique information indicating that the additional processing has been processed, is added, is set to the job to be transmitted by the job transmission unit 15.

FIG. 9 is a diagram illustrating an example of a job list on a printer in the printing process that has received jobs transmitted from the job transmission unit 15. As is clear from job names in the job list, job names ("job name 1" and the like) at the time when the pre-processing process received the jobs from the previous upstream process are obtained in the printing process. Furthermore, for example, jobs with a job ID "001" and a job ID "003" have the same character string following the prefix "_ID=". Therefore, it is clear that the jobs with the job IDs "001" and "003" are derived from the same job. The job name of the job with the job ID "003" includes "_REP=" as a prefix. Therefore, the job with the job ID "003" is a job based on re-outputting. Furthermore, jobs with a job ID "005" and a job ID "006" have the same character string following a prefix "_ID=" and include a prefix "_SEP=". Therefore, it is clear that the jobs with the job IDs "005" and "006" are divided jobs derived from the same job.

Furthermore, the job with the job ID "001" and a job with a job ID "002" have the same job name ("job name 1") but different character strings following the prefix "_ID=". Therefore, it is clear that the jobs with the job IDs "001" and "002" are different jobs. In actuality, the job with the job ID "001" is a job that is received from the spooler system A, and the job with the job ID "002" is a job that is received from the spooler system B.

As described above, in the printing process, association may be obtained based on a job processed in the previous pre-processing process and the upstream process and a job name. For example, only the original job name is written in a work instruction created in the upstream process. In this exemplary embodiment, however, a new job name is generated while the original job name being maintained. Therefore, association between the work instruction and a job may be obtained also in the printing process.

In the foregoing exemplary embodiment, the case where the disclosure is applied to a printing workflow system associated with a printing service has been explained as an example. However, the disclosure may also be applied to a workflow system for other services.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
    generate, in a case where additional processing is to be performed on a job in a workflow, the job inputted from a higher process of the workflow, unique information for identifying the additional processing, wherein the unique information visibly includes information for identifying the job; and
    control to output the generated unique information on a screen which indicates progress of at least one of the job, the additional processing and the workflow.

2. The information processing apparatus according to claim 1,
    wherein the processor generates the unique information having a length less than or equal to a preset threshold.

3. The information processing apparatus according to claim 2,
    wherein the processor generates new identification information of the information having a length less than or equal to a preset threshold.

4. The information processing apparatus according to claim 1,
    wherein when adding the unique information to identification information for identifying the information, the processor further adds specific information for specifying additional processing for the information to generate new identification information of the information.

5. The information processing apparatus according to claim 4,
    wherein the processor generates the new identification information of the information having a length less than or equal to a preset threshold.

6. The information processing apparatus according to claim 1,
    wherein the processor generates new identification information of the information having a length less than or equal to a preset threshold.

7. The information processing apparatus according to claim 1,
    wherein when the information is input, the processor generates unique information, regardless of whether or not additional processing is necessary, and
    wherein the processor adds the unique information to the identification information of the input information to generate new identification information of the information.

8. The information processing apparatus according to claim 7,
    wherein when adding the unique information to the identification information for identifying the information, the processor further adds specific information indicating that the unique information has been generated to generate the new identification information of the information.

9. A workflow system,
    wherein a plurality of the information processing apparatuses according to claim 1 are incorporated in the workflow system.

10. The workflow system according to claim 9,
    wherein the information is a job.

11. The workflow system according to claim 10,
    wherein the identification information of the information is a job name.

12. The workflow system according to claim 10,
    wherein the addition processing is any one of re-outputting of a job, division of a job, and combining of jobs.

13. A non-transitory computer readable medium storing a program causing a computer to execute a process for information processing, the process comprising:
    generating, in a case where additional processing is to be performed on a job in a workflow, the job inputted from a higher process of the workflow, unique information for identifying the additional processing, wherein the unique information visibly includes information for identifying the job; and
    controlling to output the generated unique information on a screen which indicates progress of at least one of the job, the additional processing and the workflow.

* * * * *